United States Patent [19]
Jocher et al.

[11] Patent Number: 4,866,577
[45] Date of Patent: Sep. 12, 1989

[54] MOTOR VEHICLE HEADLAMP

[75] Inventors: Reiner Jocher, Goethestrasse; Horst Dahm, Ostelsheim; Fritz Häberle, Sindelfingen, all of Fed. Rep. of Germany

[73] Assignee: Daimler-Benz AG, Fed. Rep. of Germany

[21] Appl. No.: 226,747

[22] Filed: Aug. 1, 1988

[30] Foreign Application Priority Data

Jul. 31, 1987 [DE] Fed. Rep. of Germany ....... 3725407

[51] Int. Cl.$^4$ ............................................. B60Q 1/04
[52] U.S. Cl. ..................................... 362/80; 362/285; 362/288; 362/289
[58] Field of Search .................... 362/61, 66, 80, 269, 362/273, 274, 285, 288, 289, 324, 418, 429

[56] References Cited

U.S. PATENT DOCUMENTS

| | | | |
|---|---|---|---|
| 1,083,530 | 1/1914 | Gallay | 362/288 |
| 1,426,857 | 8/1922 | Godley | 362/288 |
| 1,679,574 | 8/1928 | Hyatt | 362/288 |

Primary Examiner—Stephen F. Husar
Attorney, Agent, or Firm—Barnes & Thornburg

[57] ABSTRACT

A headlamp casing of a motor-vehicle headlamp is disclosed which is connected to an inner reflector receiving a bulb centrally in a bore and which is fastened pivotably and centrally in a trough of a body receptacle. The headlamp casing has a tubular extension which projects centrally from the outer face and is connected through an orifice in the receptacle to a fastening part and through the bore of which a headlamp bulb can be drawn out of the reflector bore from the rear side of the receptacle.

12 Claims, 1 Drawing Sheet

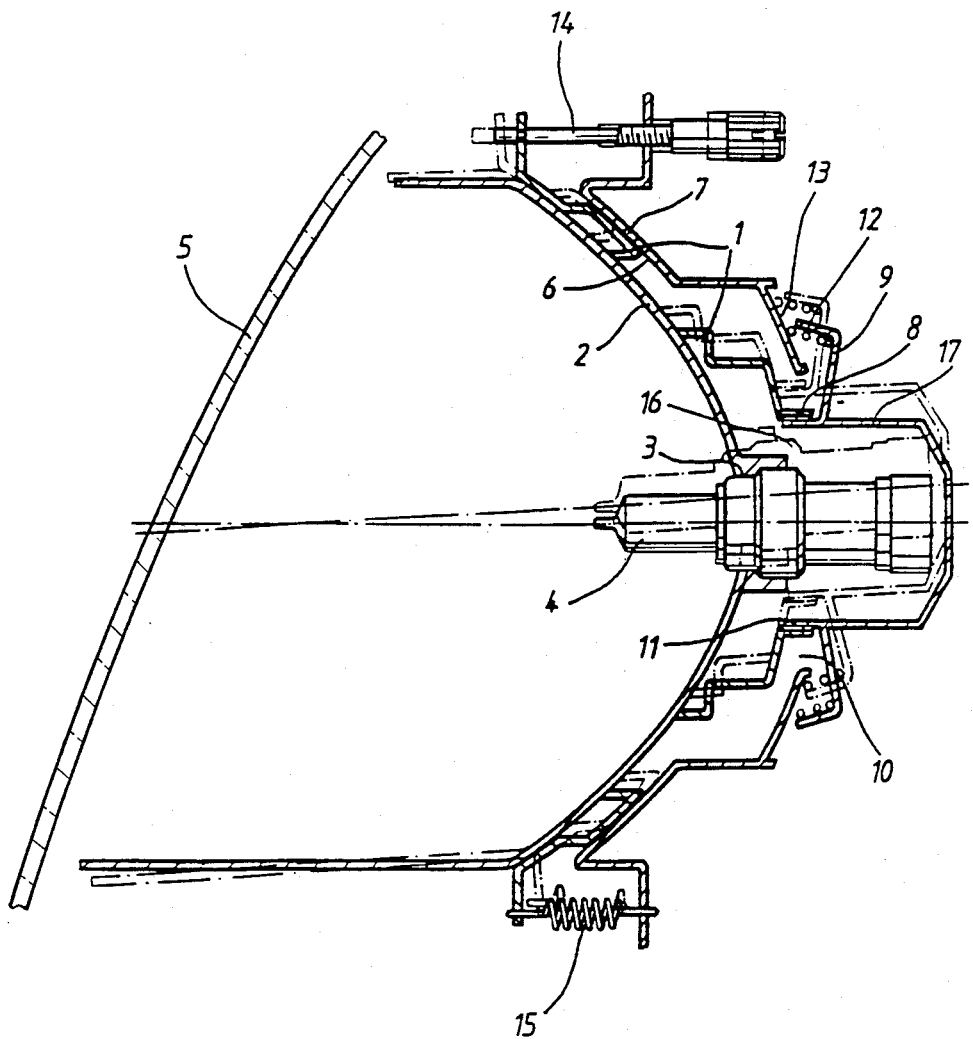

MOTOR VEHICLE HEADLAMP

BACKGROUND & SUMMARY OF THE INVENTION

The invention relates to a motor-vehicle headlamp having a casing for holding a bulb which casing is pivotally adjustably held affixed vehicle parts and supports a reflector.

German Patent Specification No. 2,936,993 discloses a motor-vehicle headlamp, the headlamp casing of which has, Projecting from the rear wall, an extension in the form of a screw which passes with play through a receiving orifice of a body receptacle and which is completed, on its rear side, with a washer and a nut, by means of which the headlamp casing can be clamped in a set adjustment position.

As a result of such a fastening of the headlamp casing, although the latter can be adjusted to the desired position and consequently the reflector set in its beam direction, nevertheless the bulb can be removed from the casing in the direction of travel only. In the event of a breakdown in the operation of the bulb, first the fastening nut has to be loosened on the rear side of the receptacle and thereafter the headlamp casing taken out and then opened so that the bulb can be replaced.

German Offenlegungsschrift No. 1,430,768 describes a headlamp casing of a motor-vehicle headlamp, to the rear side of which is attached a hollow fastening bolt which can be connected to a mounting of the vehicle. This hollow space can be used to guide a cable through the bolt into the headlamp interior. Here too, he headlamp bulb can be changed only by dismantling the beam unit on the front side of the headlamp casing.

An object of the invention is to make it simpler to mount a headlamp bulb in a reflector of a headlamp casing which can be adjusted in the region of its mid-axis centrally in a body receptacle via an extension.

This object is achieved by constructing the extension as a tubular member defining an extension bore which surrounds the bore through the reflector in all pivot position and which accommodates rearward removal of the bulb.

Because the central extension serving for fastening of the adjustable headlamp casing is made tubular, the headlamp bulb can be drawn off from the rear side of the body receptacle in a simple way, whilst furthermore, under confined conditions of space in the engine space, the fastening part can also be released and the headlamp casing taken out in the direction of travel, after which the bulb can likewise be exchanged.

According to certain preferred embodiments, the necessary braced bearing of the headlamp casing against the body receptacle can be made the most effective possible if, by means of a bayonet fixture, a specified distance between the casing and the fastening part is maintained and a spring compensates the differences in tolerance occurring thereby and at the same time allows the headlamp casing to be adjusted without releasing the fastening part.

Other objects, advantages and novel features of the present invention will become apparent from the following detailed description of the invention when considered in conjunction with the accompanying drawings.

BRIEF DESCRIPTION OF THE DRAWINGS

The single drawing FIGURE shows a sectional side view of a motor-vehicle headlamp with a reflector in the middle position, and represented by dot-and-dash lines, a reflector 15 position pivoted relative to this constructed according to a preferred embodiment of the invention.

DETAILED DESCRIPTION OF THE DRAWINGS

The motor-vehicle headlamp comprises a headlamp casing 1 which, to improve stability, has a meander-shaped generated cross-section and which is made in one piece with a reflector 2 receiving a headlamp bulb 4 centrally in a bore 3. The dish of the reflector 2 is covered in the direction of travel by a headlamp glass 5.

The headlamp casing 1 is fastened pivotably and centrally in the region of its mid-axis in a trough 6 of a body receptacle 7. For this purpose, it rests with its outer face curved in a cup-shaped manner in places against like cup-shaped wall portions in the trough 6 and is connected, through an orifice 10 in the receptacle 7, via a bayonet fixture 11 to a fastening part 9 by means of a tubular extension 8 projecting from the outer face. A predetermined distance between the headlamp casing 1 and the fastening part 9 is defined by the bayonet fixture 11.

Supported in the fastening part 9 is a spring 12 which is wound round the receiving orifice 10 and which presses against the rear side of the receptacle 7 and thereby braces the headlamp casing 1 against the receptacle 7 with low vibration, but at the same time allows a jolt-free pivoting movement of the headlamp casing 1 for adjusting the reflector 2, without the fastening part 9 having to be released. The spring 12, which is formed here by a conical spiral spring, slides over a cup-shaped rounded portion 13 on the rear side of the receptacle 7. The pivoting movement of the headlamp casing 1, together with the reflector 2 and the bulb 4 in the trough 6, is controlled by a longitudinally adjustable actuation screw 14 which interacts with a tension spring 15 engaging on the headlamp casing 1 on the opposite side. The extension 8 has a bore 16 which surrounds the bore 3 in the reflector 2 in all pivoting positions, so that the bulb 4 can be drawn off from the rear side of the receptacle 7 through the extension 8. For this purpose, in this design, the fastening part 9 is released from the headlamp casing 1, since it is additionally designed as a cover 17 which protects the bore 16 in the extension 8 against dirt.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Motor-vehicle headlamp with a headlamp casing which is pivotable in a trough of a body receptacle and is fixed centrally in the region of its mid-axis and which can be taken out of the receptacle in the direction of vehicle travel, said casing resting with its outer face curved in a cup-shaped manner in places against like cup-shaped wall portions in the trough of the receptacle and being fixably held in different pivoting positions relative to the receptacle in the rear mid-region by means of an extension, said extension being connected, through a receiving orifice allowing a pivoting movement of the headlamp casing, to a fastening part resting against the rear side of the receptacle pointing rearwardly toward an engine space or the like, said casing being connected to an inner reflector receiving a bulb centrally in a bore, wherein the extension is made tubular and defines an extension bore which surrounds a bore through the reflector in all the pivoting positions, and where in the bulb can be withdrawn off from the rear side of the receptacle through the extension.

2. Motor-vehicle headlamp according to claim 1, wherein the extension is connected to the fastening part by means of a bayonet fixture.

3. Motor-vehicle headlamp according to claim 1, wherein the headlamp casing can be fixed in the trough of the receptacle, so as to be braced with low vibration, by means of a resilient element which is supported on the fastening part and which presses against the rear side of the receptacle.

4. Motor-vehicle headlamp according to claim 2, wherein the headlamp casing can be fixed in the trough of the receptacle, so as to be braced with low vibration, by means of a resilient element which is supported on the fastening part and which presses against the rear side of the receptacle.

5. Motor-vehicle headlamp according to claim 3, wherein during the pivoting of the headlamp casing, a spring, serving as said resilient element, is wound round the receptacle orifice and slides over a cup-shaped rounded portion of the receptacle.

6. Motor-vehicle headlamp according to claim 1, wherein the fastening part is formed by a cover spanning the extension bore.

7. Motor-vehicle headlamp according to claim 1, wherein the headlamp casing is made in one piece with the reflector.

8. Motor-vehicle headlamp according to claim 1, wherein the headlamp casing has a meander-shaped generated cross-section.

9. Motor-vehicle headlamp according to claim 4, wherein during the pivoting of the headlamp casing, a spring, serving as said resilient element, is wound round the receptacle orifice and slides over a cup-shaped rounded portion of the receptacle.

10. Motor-vehicle headlamp according to claim 9, wherein the fastening part is formed by a cover spanning the extension bore.

11. Motor-vehicle headlamp according to claim 10, wherein the headlamp casing is made in one piece with the reflector.

12. Motor-vehicle headlamp according to claim 11, wherein the headlamp casing has a meander-shaped generated cross-section.

* * * * *